United States Patent
Takahashi et al.

(10) Patent No.: US 11,272,386 B2
(45) Date of Patent: Mar. 8, 2022

(54) MOBILE STATION AND MOBILE COMMUNICATION METHOD

(71) Applicant: NTT DOCOMO, INC., Tokyo (JP)

(72) Inventors: Hideaki Takahashi, Tokyo (JP); Tooru Uchino, Tokyo (JP); Wuri Andarmawanti Hapsari, Tokyo (JP); Kunihiko Teshima, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/738,267

(22) PCT Filed: Jun. 22, 2016

(86) PCT No.: PCT/JP2016/068509
§ 371 (c)(1),
(2) Date: Dec. 20, 2017

(87) PCT Pub. No.: WO2016/208620
PCT Pub. Date: Dec. 29, 2016

(65) Prior Publication Data
US 2018/0192314 A1 Jul. 5, 2018

(30) Foreign Application Priority Data

Jun. 26, 2015 (JP) .............................. JP2015-128712

(51) Int. Cl.
*H04W 24/10* (2009.01)
*H04W 72/04* (2009.01)
(Continued)

(52) U.S. Cl.
CPC ........... *H04W 24/10* (2013.01); *H04W 16/14* (2013.01); *H04W 16/32* (2013.01); *H04W 72/04* (2013.01);
(Continued)

(58) Field of Classification Search
CPC ... H04W 24/10; H04W 72/085; H04W 76/11; H04W 72/0453; H04W 16/32; H04W 72/04; H04W 16/14
(Continued)

(56) References Cited

U.S. PATENT DOCUMENTS 7,929,508 B1* 4/2011 Yucek .................... H04W 72/06
370/338
2008/0171568 A1* 7/2008 Choi .................. H04W 52/0245
455/522

(Continued)

FOREIGN PATENT DOCUMENTS

EP 3170340 A1 5/2017
EP 3217703 A1 9/2017
(Continued)

OTHER PUBLICATIONS

Kyocera, Further consideration of RRM measurement on LAA cell, May 25-29, 2015, 5 pages.*
(Continued)

*Primary Examiner* — Kwang B Yao
*Assistant Examiner* — Syed M Bokhari
(74) *Attorney, Agent, or Firm* — Osha Bergman Watanabe & Burton LLP (57) ABSTRACT

Provided are a mobile station and a mobile communication method in which, when a secondary cell (SCell) is established in an unlicensed band, received power in the unlicensed band can be efficiently measured and reported to a radio access network. A UE (100) includes an RSSI measurement unit (133) that repeatedly measures RSSI in the frequency band of the secondary cell, a report determination unit (140) that determines, based on an RSSI measurement result, whether to report the measurement result to the radio access network, and a measurement report unit (150) that
(Continued)

reports the measurement result to the radio access network. The report determination unit (140) determines that the measurement result is to be reported to the radio access network when the measurement result exceeds a predetermined threshold.

6 Claims, 8 Drawing Sheets

(51) Int. Cl.
| | | |
|---|---|---|
| *H04W 16/14* | (2009.01) | |
| *H04W 76/11* | (2018.01) | |
| *H04W 16/32* | (2009.01) | |
| *H04W 72/08* | (2009.01) | |

(52) U.S. Cl.
CPC ..... *H04W 72/0453* (2013.01); *H04W 72/085* (2013.01); *H04W 76/11* (2018.02); *Y02D 30/70* (2020.08)

(58) Field of Classification Search
USPC .................. 370/252, 329, 230, 338, 332
See application file for complete search history.

(56) References Cited

U.S. PATENT DOCUMENTS

| | | | | |
|---|---|---|---|---|
| 2012/0194168 | A1* | 8/2012 | Yamaguchi ............ | B64D 45/02 324/72 |
| 2013/0022026 | A1* | 1/2013 | Ishii .................... | H04L 5/001 370/332 |
| 2013/0336156 | A1* | 12/2013 | Wei ..................... | H04L 5/001 370/252 |
| 2014/0086293 | A1* | 3/2014 | Koike .................. | H04B 17/327 375/224 |
| 2014/0153390 | A1* | 6/2014 | Ishii .................... | H04W 28/0289 370/230 |
| 2015/0264592 | A1* | 9/2015 | Novlan ................. | H04W 52/0206 370/252 |
| 2016/0007350 | A1* | 1/2016 | Xiong .................. | H04W 24/10 370/252 |
| 2016/0338118 | A1* | 11/2016 | Vajapeyam ............ | H04L 69/323 |
| 2017/0094576 | A1* | 3/2017 | Kazmi .................. | H04L 1/1887 |
| 2017/0142746 | A1* | 5/2017 | Koorapaty ............ | H04W 16/14 |

FOREIGN PATENT DOCUMENTS

| | | |
|---|---|---|
| JP | 2009-065353 A | 3/2009 |
| JP | 2013-243725 A | 12/2013 |
| JP | 2014-150300 A | 8/2014 |

OTHER PUBLICATIONS

Office Action issued in the counterpart Japanese Office Action No. 2015-128712, dated Sep. 4, 2018 (8 pages).
Extended European Search Report in counterpart European Application No. 16814390.7, dated May 15, 2018 (12 pages).
International Search Report issued in PCT/JP2016/068509 dated Aug. 23, 2016 (2 pages).
Written Opinion of the International Searching Authority issued in PCT/JP2016/068509 dated Aug. 23, 2016 (7 pages).
Kyocera; "Further consideration of RRM measurement on LAA cell"; 3GPP TSG-RAN WG2 #90, R2-152628; Fukuoka, Japan; May 25-29, 2015 (5 pages).
Ericsson; "RRM Measurements for LAA"; 3GPP TSG-RAN WG2 #90, Tdoc R2-152480; Fukuoka, Japan; May 25-29, 2015 (6 pages).
Samsung; "RRM Measurements for LAA"; 3GPP TSG-RAN2#89, R2-150191; Athens, Greece; Februray 9-13, 2015 (3 pages).
Ericsson et al.; "Revised SID; Study on Licensed-Assisted Access to Unlicensed Spectrum"; 3GPP TSG RAN Meeting #66, RP-141817; Maui, USA; Dec. 8-11, 2014 (8 pages).
ETSI MCC; "Draft Report of 3GPP TSG RAN WG2 meeting #89bis"; 3GPP TSG-RAN Working Group 2 meeting #90, R2-152002; Fukuoka, Japan; May 25-29, 2015 (137 pages).
Japanese Office Action w/ translation obtained from Global Dossier for corresponding Japanese Application No. 2015-128712 dated Aug. 23, 2016 (11 pages).
Decision of refusal dated Mar. 14, 2017 for corresponding Japanese Application No. 2015-128712 with an English translation obtained from Global Dossier (11 pages).
The Report of Reconsideration before Appeal drafted on Aug. 1, 2017 for corresponding Japanese Application No. 2015-128712 with an English translation obtained from Global Dossier (12 pages).
Office Action issued in the counterpart European Patent Application No. 16814390.7, dated Mar. 21, 2019 (6 pages).
Office Action issued in the counterpart European Patent Application No. 16814390.7, dated Nov. 15, 2019 (5 pages).
Office Action issued in the counterpart Chinese Patent Application No. 201680037615.9, dated Nov. 27, 2020 (14 pages).

* cited by examiner

5.5.4.X  Event D2 (Inter-carrier frequency becomes better than threshold)

The UE shall:

1> consider the entering condition for this event to be satisfied when condition D2-1, as specified below, is fulfilled;

1> consider the leaving condition for this event to be satisfied when condition D2-2, as specified below, is fulfilled;

Inequality D2-1 (Entering condition)

$Mf + Of - Hys > Thresh$

Inequality D2-2 (Leaving condition)

$Mf + Of + Hys < Thresh$

The variables in the formula are defined as follows:

*Mf* is the RSSI measurement result of the inter-carrier frequency, not taking into account any offsets.

*Of* is the frequency specific offset of the inter-carrier frequency (i.e. *offsetFreq* as defined within *measObjectEUTRA* corresponding to the carrier frequency).

*Hys* is the hysteresis parameter for this event (i.e. *hysteresis* as defined within *reportConfigEUTRA* for this event).

*Thresh* is the threshold parameter for this event (i.e. *d2-Threshold* as defined within *reportConfigEUTRA* for this event).

*Mf, Thresh* are expressed in dBm.

*Of, Hys* are expressed in dB.

FIG. 7

*ReportConfigEUTRA* information element

```
-- ASN1START

ReportConfigEUTRA ::=        SEQUENCE {
    triggerType                  CHOICE {
        event                        SEQUENCE {
            eventId                      CHOICE {
                eventA1                      SEQUENCE {
                    a1-Threshold                 ThresholdEUTRA
                },
                eventA2                      SEQUENCE {
                    a2-Threshold                 ThresholdEUTRA
                },
                eventA3                      SEQUENCE {
                    a3-Offset                    INTEGER (-30..30),
                    reportOnLeave                BOOLEAN
                },
                eventA4                      SEQUENCE {
                    a4-Threshold                 ThresholdEUTRA
                },
                eventA5                      SEQUENCE {
                    a5-Threshold1                    ThresholdEUTRA,
                    a5-Threshold2                    ThresholdEUTRA
                },
                ...,
                eventA6-r10                  SEQUENCE {
                    a6-Offset-r10                INTEGER (-30..30),
                    a6-ReportOnLeave-r10         BOOLEAN
                },
                eventC1-r12                  SEQUENCE {
                    c1-Threshold-r12             ThresholdEUTRA-v1250,
                    c1-ReportOnLeave-r12         BOOLEAN
                },
                eventC2-r12                  SEQUENCE {
                    c2-RefCSI-RS-r12             MeasCSI-RS-Id-r12,
                    c2-Offset-r12                INTEGER (-30..30),
                    c2-ReportOnLeave-r12         BOOLEAN
                },
                eventD2-r13                  SEQUENCE {
                    d2-Threshold-r13             ThresholdEUTRA-v13xy,
                    d2-ReportOnLeave-r13         BOOLEAN
                }
            },
        },
```

FIG. 8

```
        hysteresis                      Hysteresis,
        timeToTrigger                   TimeToTrigger
    },
    periodical                          SEQUENCE {
        purpose                             ENUMERATED {
                                                reportStrongestCells, reportCGI}
        }
    },
    triggerQuantity                 ENUMERATED {rsrp, rsrq},
    reportQuantity                  ENUMERATED {sameAsTriggerQuantity, both},
    maxReportCells                  INTEGER (1..maxCellReport),
    reportInterval                  ReportInterval,
    reportAmount                    ENUMERATED {r1, r2, r4, r8, r16, r32, r64, infinity},
    ...,
    [[ si-RequestForHO-r9               ENUMERATED {setup}      OPTIONAL,   -- Cond
reportCGI
       ue-RxTxTimeDiffPeriodical-r9     ENUMERATED {setup}      OPTIONAL    -- Need OR
    ]],
    [[ includeLocationInfo-r10          ENUMERATED {true}       OPTIONAL,   -- Need OR
       reportAddNeighMeas-r10           ENUMERATED {setup}      OPTIONAL    -- Need OR
    ]],
    [[ alternativeTimeToTrigger-r12     CHOICE {
           release                          NULL,
           setup                            TimeToTrigger
       }                                                OPTIONAL,   -- Need ON
       useT312-r12                      BOOLEAN         OPTIONAL,   -- Need ON
       usePSCell-r12                    BOOLEAN         OPTIONAL,   -- Need ON
       aN-Threshold1-v1250              RSRQ-RangeConfig-r12    OPTIONAL,   -- Need ON
       a5-Threshold2-v1250              RSRQ-RangeConfig-r12    OPTIONAL,   -- Need ON
       reportStrongestCSI-RSs-r12       BOOLEAN     OPTIONAL,   -- Need ON
       reportCRS-Meas-r12               BOOLEAN     OPTIONAL,   -- Need ON
       triggerQuantityCSI-RS-r12        BOOLEAN     OPTIONAL    -- Need ON
    ]],
    [[ reportCarrierFreq-r13    BOOLEAN                                         OPTIONAL,-- Need ON
       reportRSSI-Meas-r13      ENUMERATED {L3-RSSI, histogram, both}   OPTIONAL,-- Need ON
       triggerQuantityRSSI-r13  BOOLEAN                                         OPTIONAL -- Need ON
    ]]
}

RSRQ-RangeConfig-r12 ::=    CHOICE {
    release                     NULL,
    setup                       RSRQ-Range-v1250
}

ThresholdEUTRA ::=          CHOICE{
    threshold-RSRP              RSRP-Range,
    threshold-RSRQ              RSRQ-Range
}

ThresholdEUTRA-v1250 ::=    CSI-RSRP-Range-r12

ThresholdEUTRA-v13xy ::=        RSSI-Range-r13

-- ASN1STOP
```

FIG. 9

MOBILE STATION AND MOBILE COMMUNICATION METHOD

TECHNICAL FIELD

The present invention relates to a mobile station and a mobile communication method that perform carrier aggregation using two or more component carriers, and relates particularly to a mobile station and a mobile communication method that perform carrier aggregation using an unlicensed band.

BACKGROUND ART

The 3rd Generation Partnership Project (3GPP) is discussing Licensed-Assisted Access (LAA), which implements Long Term Evolution (LTE) mobile communications using an "unlicensed band" (specific frequency band), which is any of a license-free frequency band used by a wireless LAN, Bluetooth (registered trademark), and the like.

Specifically, what is being discussed is how to set a secondary cell (SCell) in execution of carrier aggregation (CA), or particularly, how to establish a component carrier (CC) of the SCell in an unlicensed band (see Non-patent document 1).

There is an agreement that an SCell in LAA is set and activated using the existing system of Radio Resource Management (RRM) measurements (see Non-patent document 2).

In LAA, regarding the quality of an unlicensed band and a problem called "hidden node problem", which occurs when there is a node of which an LTE radio base station is hardly aware, LAA has been studied on measurement of Received Signal Strength Indicator (RSSI) of the received power of the entire system bandwidth in the unlicensed band.

PRIOR ART DOCUMENT

Non-Patent Document

Non-patent document 1: 3GPP RP-141817, "Study on Licensed-Assisted Access to Unlicensed Spectrum", 3GPP, December 2014

Non-patent document 2: 3GPP R2-152002, "Draft Report of 3GPP TSG RAN WG2 meeting #89bis", 3GPP, December 2014

SUMMARY OF THE INVENTION

If a DRS is transmitted also to a secondary cell (SCell) established in an unlicensed band as described above, the reference signal received power (RSRP) and reference signal received quality (RSRQ) can be measured in the same manner as for the existing RRM measurements, i.e., as in a primary cell (PCell).

However, for RSSI measurement of an unlicensed band, a mobile station (UE) cannot determine the timing to measure the RSSI or the method for reporting the measured RSSI to a radio access network because the existing RRM measurements do not cover that measurement.

The present invention has been made in view of such circumstances, and has an objective to provide a mobile station and a mobile communication method that, when a secondary cell (SCell) is established in an unlicensed band, can measure received power of the unlicensed band efficiently and report the measured received power to a radio access network.

A mobile station according to an aspect of the present invention performs carrier aggregation by establishing a secondary cell in a specific frequency band requiring no license, the mobile station. The mobile station includes a received power measurement unit that repeatedly measures received power in the frequency band of the secondary cell; a report determination unit that determines, based on a measurement result of the received power measured by the received power measurement unit, whether the measurement result is to be reported to a radio access network; and a measurement report unit that reports the measurement result to the radio access network. The report determination unit determines that the measurement result is to be reported to the radio access network when the measurement result exceeds a predetermined threshold.

A mobile communication method according to another aspect of the present invention relates to a mobile communication method for performing carrier aggregation by establishing a secondary cell in a specific frequency band requiring no license. The mobile communication method includes repeatedly measuring received power in the frequency band of the secondary cell; determining, based on a measurement result of the received power measured, whether the measurement result is to be reported to a radio access network; and reporting the measurement result to the radio access network. The determining involves reporting the measurement result to the radio access network when the measurement result exceeds a predetermined threshold.

MODE FOR CARRYING OUT THE INVENTION

Embodiments are described below using the drawings. Note that same or similar functions or configurations are denoted by same or similar reference signs, and their descriptions are omitted where possible.

(1) Overview of Overall Configuration of the Mobile Communication System

Figure 1:
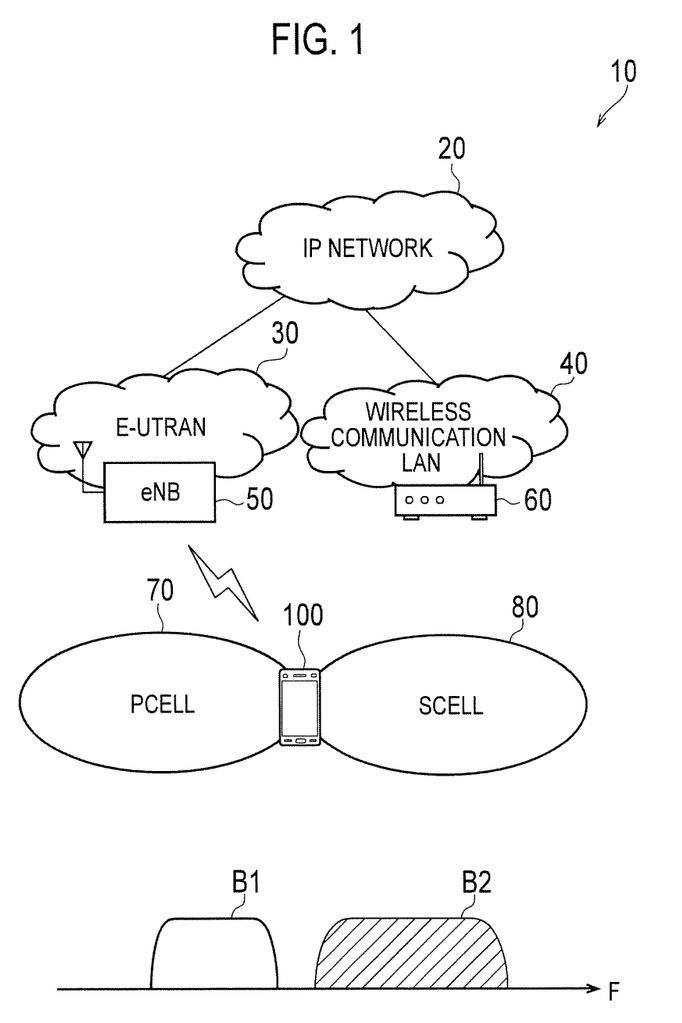
FIG. 1 is a schematic diagram of the overcall configuration of a mobile communication system 10.

FIG. 1 is a schematic diagram of the overall configuration of a mobile communication system 10 according to the present embodiment. The mobile communication system 10 includes an Evolved Universal Terrestrial Radio Access Network 30 (hereinafter called an E-UTRAN 30) and a mobile station 100 (hereinafter called a UE 100).

The E-UTRAN 30 includes a radio base station 50 (hereinafter called an eNB 50). The E-UTRAN 30 is a radio access network conforming to Long Term Evolution (LTE), and the eNB 50 and the UE 100 communicate with each other wirelessly in conformity with LTE. Note that LTE includes LTE-Advanced.

An IP network 20 is a communication network based on the Internet Protocol. IP network 20 may include the Internet. The E-UTRAN 30 is connected to the IP network 20.

A wireless LAN 40 is connected to the IP network 20, as well. The wireless LAN 40 includes an access point 60. The access point 60 and the UE 100 can communicate with each other wirelessly in conformity with a predetermined wireless LAN standard (such as IEEE802.11b/g/n/ac). Note that the UE 100 does not necessarily have to be equipped with a wireless communication function that conforms to the wireless LAN.

An unlicensed band B2 is allocated to the wireless LAN 40 as a frequency band used by the wireless LAN 40. An unlicensed band (specific frequency band) is a frequency band which is allocated to a wireless communication scheme requiring no license by an administrative agency of a country or the like. Examples of such include a wireless LAN and Bluetooth (registered trademark).

The mobile communication system 10 supports carrier aggregation, which uses two or more component carriers to perform simultaneous communications. In the present embodiment, the mobile communication system 10 can particularly perform carrier aggregation based on Licensed-Assisted Access (LAA).

Specifically, the mobile communication system 10 can establish a primary cell 70 (hereinafter called a PCell 70) in a licensed band B1 licensed to an operator of the mobile communication system 10 (PLMN) for LTE, and establish one or more secondary cells 80 (hereinafter called SCells 80) in an unlicensed band B2 used by the wireless LAN 40 and the like. The SCell 80 is set along with the PCell 70.

Typically, the unlicensed band B2 is broader than the licensed band B1.

The center frequency of a component carrier or the like is designated for the licensed band B1 for LTE, based on the E-UTRAN Absolute Radio Frequency Channel Number (EARFCN) defined in LTE. The same may be defined for the unlicensed band B2 based on a system equivalent to the EARFCN. Specifically, the center frequency and frequency bandwidth of a carrier in the unlicensed band B2 may be defined.

(2) Functional Block Configuration

Figure 2:
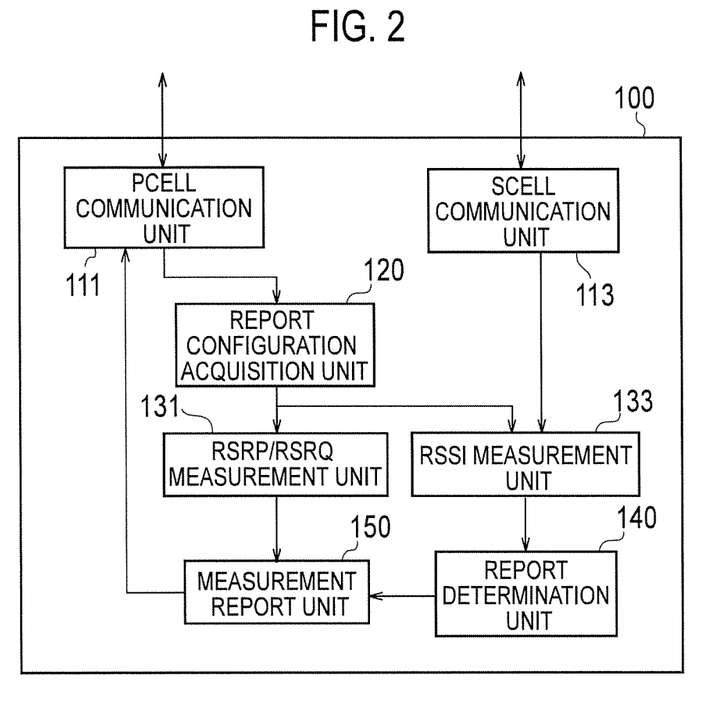
FIG. 2 is a diagram of the functional block configuration of a UE 100.

Next, a description is given of the functional block configuration of the UE 100 included in the mobile communication system 10. FIG. 2 is a diagram of the functional block configuration of the UE 100.

As illustrated in FIG. 2, the UE 100 includes a PCell communication unit 111, an SCell communication unit 113, a report configuration acquisition unit 120, an RSRP/RSRQ measurement unit 131, an RSSI measurement unit 133, a report determination unit 140, and a measurement report unit 150. Note that each functional block is formed by an information processing processor such as a CPU and a storage device such as memory and a hard disk.

The PCell communication unit 111 performs wireless communication via the PCell 70. Specifically, the PCell communication unit 111 establishes Radio Resource Control (RRC) Connection to the E-UTRAN 30 via the PCell 70 and performs wireless communication.

The SCell communication unit 113 performs wireless communication via the SCell 80. Specifically, the SCell communication unit 113 can perform wireless communication via one or more SCells 80 in addition to the wireless communication performed by the PCell communication unit 111 via the PCell 70. In other words, carrier aggregation (CA) using two or more component carriers (CC) is accomplished by the PCell communication unit 111 and the SCell communication unit 113.

Note that the SCell communication unit 113 can perform wireless communication using either or both of the SCell 80 established in the licensed band B1 and the SCell 80 established in the unlicensed band B2.

The report configuration acquisition unit 120 acquires a report configuration (ReportConfig) from the E-UTRAN 30. The report configuration specifies the format for reporting a result of measurements on the reception state in the cells (the PCell 70 and the SCell 80) on which the UE 100 is camping.

Specifically, the report configuration acquisition unit 120 acquires a ReportConfigEUTRA from the E-UTRAN 30. The ReportConfigEUTRA contains an element that specifies whether to report a frequency distribution of a measurement result, the average value of the measurement result, or both of the frequency distribution and the average value.

A frequency distribution of a measurement result is a frequency distribution, or specifically a histogram, of RSSI repeatedly measured by the RSSI measurement unit 133. The average value of a measurement result is the average value of such RSSI.

The report configuration also contains the intervals at which the UE 100 measures RSSI, or a condition (a triggered event) for starting the RSSI measurement.

Based on a reference signal (RS) specified by a Discovery Signal (DRS), the RSRP/RSRQ measurement unit 131 measures the reception state of the reference signal in the PCell 70 or the SCell 80. Specifically, based on a reference signal specified by a Primary Synchronization Signal (PSS), a Secondary Synchronization Signal (SSS), or a Cell-specific Reference Signal (CRS) periodically transmitted from the E-UTRAN 30 (or the eNB 50 to be specific), the RSRP/RSRQ measurement unit 131 measures either or both of the received power and the reception quality of the reference signal.

More specifically, the RSRP/RSRQ measurement unit 131 measures either or both of a reference signal received power (RSRP) and a reference signal received quality (RSRQ).

The RSSI measurement unit 133 determines the received power in the unlicensed band B2. In the present embodiment, the RSSI measurement unit 133 forms a received power measurement unit.

The value of such received power is defined in 3GPP TS36.214 as a Received Signal Strength Indicator (RSSI).

The RSSI measurement unit 133 repeatedly measures RSSI in the frequency band of the SCell 80. Specifically, the RSSI measurement unit 133 repeats measurement of RSSI at predetermined intervals (periodic measurement). The predetermined intervals may be specified by the E-UTRAN 30 or preset in the UE 100.

Note that the RSSI measurement unit 133 can measure the RSSI for each frequency of a carrier (component carrier) used in the frequency band of the SCell 80. The RSSI measurement unit 133 can also measure the RSSI over the entire system bandwidth of the unlicensed band B2. The entire system bandwidth means the entire frequency band receivable by the UE 100.

The report determination unit 140 determines whether an RSSI measurement result is to be reported to the E-UTRAN 30. Specifically, the report determination unit 140 determines, based on a measurement result of RSSI measured by the RSSI measurement unit 133, whether the measurement result is to be reported.

When the RSSI measurement result exceeds a predetermined threshold, the report determination unit 140 determines that the measurement result is to be reported to the E-UTRAN 30.

Specifically, the report determination unit 140 determines whether an RSSI measurement result is to be reported, using the following conditions: an entering condition (report start condition) satisfied when an RSSI measurement value in a frequency band of a measurement target carrier in the SCell 80 (a measurement target different frequency carrier) exceeds a predetermined threshold, and a leaving condition (report stop condition) satisfied when such a measurement value equals or falls below the predetermined threshold.

More specifically, when the relative frequency (i.e., probability) in a given category in a frequency distribution of a measurement result exceeds the predetermined threshold, the report determination unit 140 can determine that the measurement result is to be reported.

A frequency distribution of an RSSI measurement result is a histogram of RSSI in a given frequency band repeatedly measured by the RSSI measurement unit 133. An example of the histogram will be given later.

The measurement report unit 150 reports measurement results measured by the RSRP/RSRQ measurement unit 131 and the RSSI measurement unit 133 to the E-UTRAN 30.

Specifically, the measurement report unit 150 reports the RSRP/RSRQ measured by the RSRP/RSRQ measurement unit 131 to the E-UTRAN 30. The measurement report unit 150 also reports the RSSI measured by the RSSI measurement unit 133 to the E-UTRAN 30.

In this manner, for the reporting of the measured RSSI to the E-UTRAN 30, the measurement report unit 150 can report the measurement result to the E-UTRAN 30 not on a cell basis but for each frequency band of a measurement target carrier (a measurement target different frequency carrier) (namely, on a carrier basis).

The measurement report unit 150 reports the measurement result of RSSI measured by the RSSI measurement unit 133 to the E-UTRAN 30 based on the report configuration (ReportConfig) acquired by the report configuration acquisition unit 120.

Specifically, the measurement report unit 150 can report a histogram (frequency distribution) of RSSI, the average value of RSSI, or both the histogram and the average value to the E-UTRAN 30.

The measurement report unit 150 can report a histogram (frequency distribution) of RSSI to the E-UTRAN 30. For the reporting of a histogram of RSSI, the measurement report unit 150 can generate a histogram based on a measurement result of RSSI before the Layer-3 filtering defined by 3rd Generation Partnership Project (3GPP).

That is to say, the histogram can be generated based on an RSSI measurement result in the physical layer before the Layer-3 filtering. In this manner, the measurement report unit 150 can report the histogram based on an RSSI measurement result in the physical layer, the measurement result before filtering based on a predetermined report condition (Layer-3 filtering).

The Layer-3 filtering is defined in Clause 5.5.3.2 of 3GPP TS36.331. The Layer-3 filtering narrows down RSSI measurement results or the like in the physical layer based on a predetermined condition before the measurement results are used for the evaluation by the upper layer.

The measurement report unit 150 may report the average value of measurement results after the Layer-3 filtering, not a histogram of RSSI, to the E-UTRAN 30. To the E-UTRAN 30, the measurement report unit 150 may report, as the average value, the value in a category with the highest relative frequency in a histogram of RSSI.

(3) Operation of the Mobile Communication System

Next, a description is given of an operation of the above-described mobile communication system 10. Specifically, with reference to FIGS. 3 to 7, a description is given of a communication sequence for measurement reporting between the E-UTRAN 30 and the UE 100, a procedure of a measurement operation by the UE 100, and an operation definition example of the UE 100.

(3.1) Communication Sequence

Figure 3:
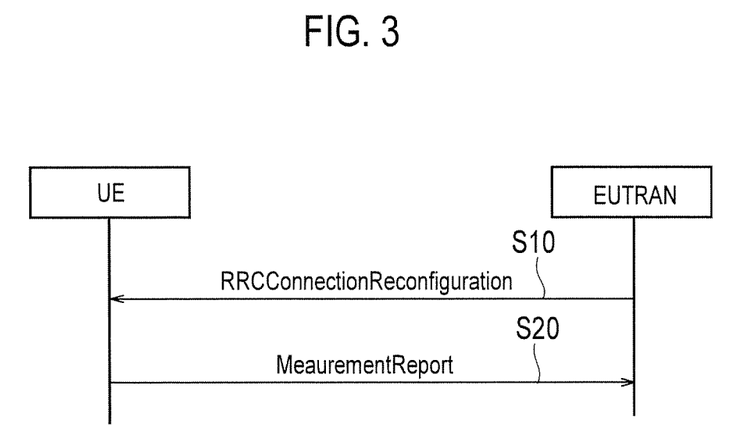
FIG. 3 is a diagram illustrating a communication sequence for measurement reporting between an E-UTRAN 30 and the UE 100.

FIG. 3 shows a communication sequence for measurement reporting between the E-UTRAN 30 and the UE 100. As illustrated in FIG. 3, the E-UTRAN 30 transmits an RRCConnectionReconfigration to the UE 100 via a serving cell, the PCell 70 (S10). The RRCConnectionReconfiguration contains an information element, a MeasConfig, instructing measurement from the UE 100. The MeasConfig contains the ReportConfig (ReportConfigEUTRA) described earlier.

The UE 100 acquires the MeasConfig contained in the received RRCConnectionReconfigration. Based on the acquired MeasConfig, the UE 100 measures the reception state of the UE 100 and reports a result of the measurement to the E-UTRAN 30 as a MeasurementReport (S20).

Note that a PSS, an SSS, and a CRS are transmitted from the E-UTRAN 30 to the UE 100 with other information elements.

(3.2) Operation Procedure of the Mobile Station

Figure 4:
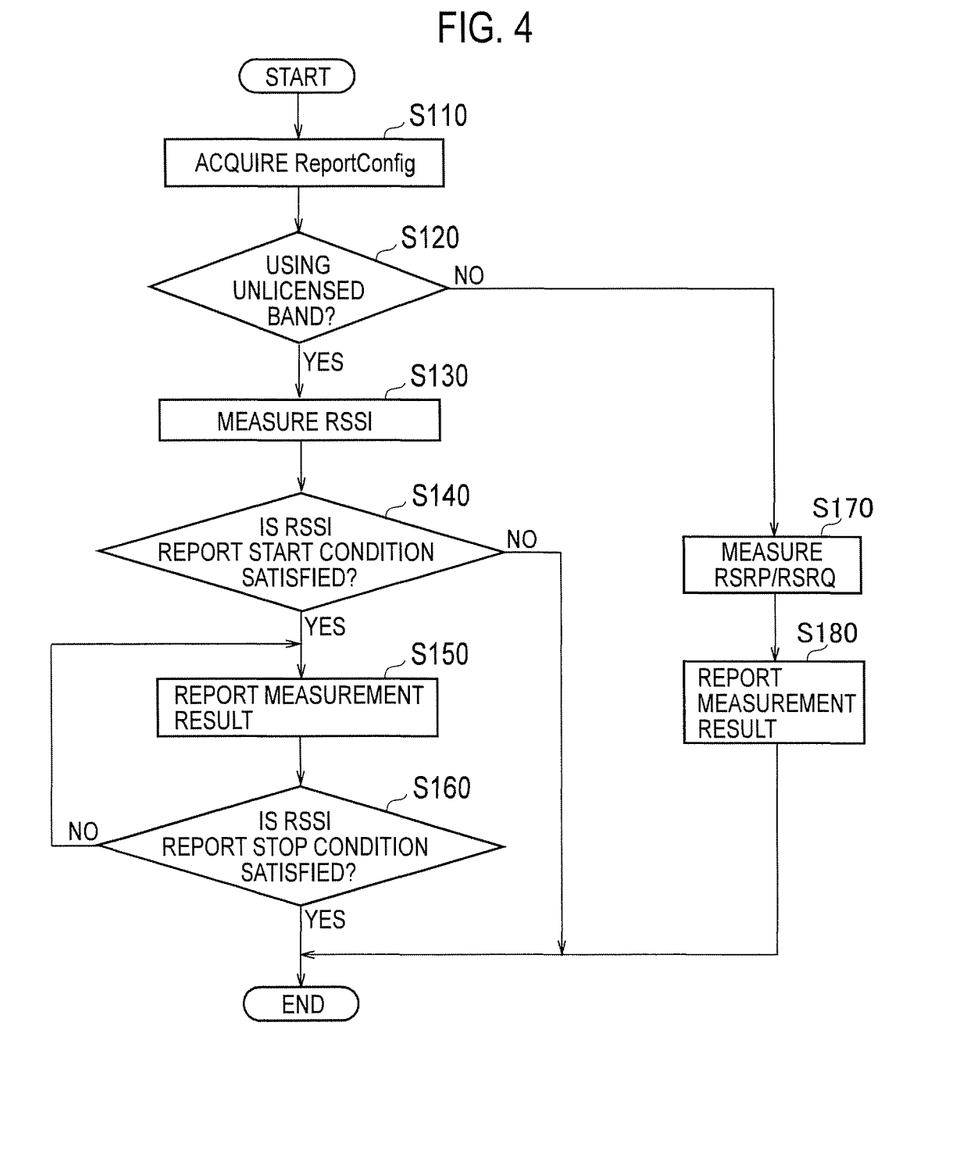
FIG. 4 is a flowchart of a measurement operation performed by the UE 100.

FIG. 4 illustrates a procedure of a measurement operation by the UE 100. Here, the UE 100 is performing carrier aggregation, setting each of a primary cell (the PCell 70) and one or more secondary cells (the Scells 80) as its serving cell. Here, the PCell 70 is established in the licensed band B1, and the SCell 80 is established in the unlicensed band B2 (see FIG. 1).

As illustrated in FIG. 4, the UE 100 acquires a ReportConfig transmitted from the E-UTRAN 30 (S110). Specifically, as described above, based on the ReportConfig contained in an acquired MeasConfig, the UE 100 acquires the format for reporting a measurement result of the reception states in the cells on which the UE 100 is camping (the PCell 70 and the SCell 80).

The reporting format contains a method for measuring RSSI in a frequency band of a measurement target carrier of the SCell 80 established in the unlicensed band B2 (a measurement target different frequency carrier).

The UE 100 determines whether the measurement target carrier uses the unlicensed band B2, or in other words, whether the measurement target carrier is allocated the unlicensed band B2 (S120).

If the unlicensed band B2 is used, the UE 100 repeatedly measures RSSI in the frequency band for the measurement target carrier (S130). Specifically, the UE 100 measures the level of received power (unit: dBm) in this frequency band.

The UE 100 determines whether a measurement result on RSSI repeatedly measured exceeds a predetermined threshold and satisfies the entering condition (report start condition) (S140). Specifically, as described above, when a relative frequency (i.e., probability) in a given category in a histogram of RSSI generated by repeated measurement of RSSI exceeds the predetermined threshold, the UE 100 can determine to report the measurement result to the E-UTRAN 30.

Figure 5:
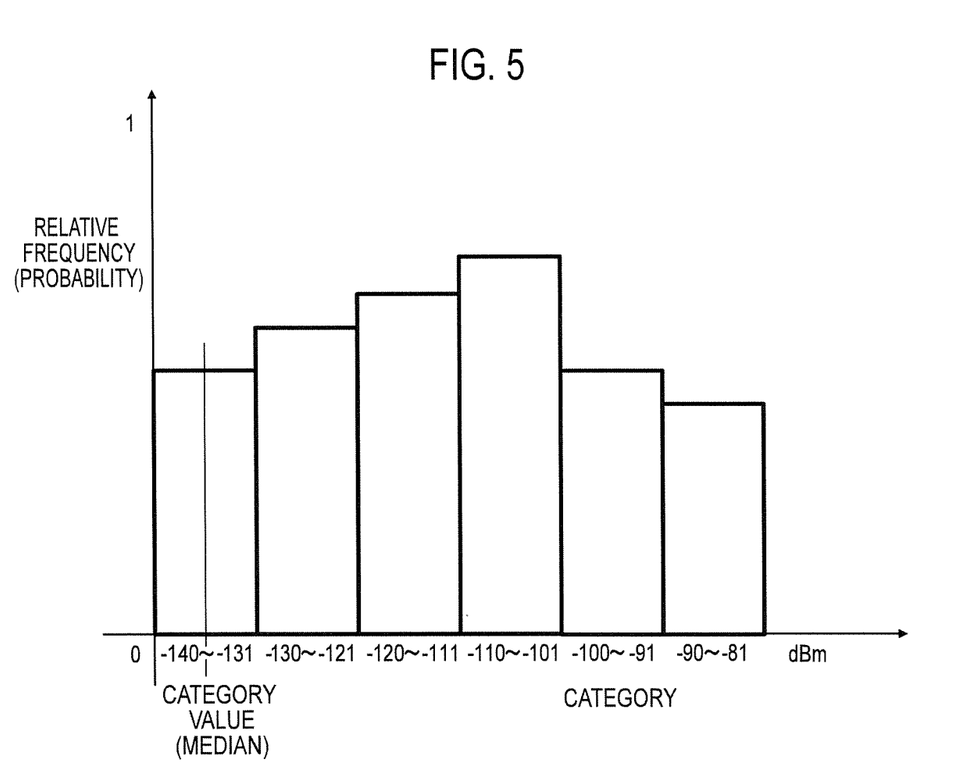
FIG. 5 is a diagram illustrating an example of a histogram of RSSI (measurement result).

In this respect, FIG. 5 illustrates an example of a histogram of RSSI (measurement result). As illustrated in FIG. 5, the RSSI histogram represents the relation between a plurality of categories according to the levels of RSSI (received power) and relative frequency (probability). The relative frequency in a given category indicates the proportion of the category to the entire measurement frequency, and represented with a numerical value between 0 and 1.

In the example of the histogram shown in FIG. 5, the received power between −140 dBm and −81 dBm is divided into categories of 10 dB. For example, when the relative frequency of RSSI in −130 to −121 dBm (a predetermined category) exceeds 0.3 (a predetermined threshold), the UE 100 determines to report the histogram of RSSI shown in FIG. 5 or the like. As a category indication value of a predetermined category, the median of the category may be used.

The UE 100 reports the measurement result on measured RSSI to the E-UTRAN 30 (S150). Specifically, as described above, the UE 100 can report a histogram (frequency distribution) of RSSI, the average value of RSSI, or both of the histogram and the average value to the E-UTRAN 30.

Further, as described above, a measurement result after Layer-3 filtering may be used. Also, when the average value of RSSI is to be reported, the value in a category with the highest relative frequency in the histogram of RSSI may be reported as the average value to the E-UTRAN 30.

The UE 100 determines whether a measurement result of RSSI being repeatedly measured equals or falls below a predetermined threshold and satisfies the leaving condition (report stop condition) (S160). Specifically, as described above, when the relative frequency (i.e., probability) in a given category in a histogram of RSSI generated by the repeated measurement of RSSI equals or falls below the predetermined threshold, the UE 100 can determine to stop reporting the measurement result.

If, on the other hand, the measurement target carrier is allocated not the unlicensed band B2 but the licensed band B1, or in other words, if the licensed band B1 is used, the UE 100 measures the RSRP/RSRQ of a reference signal (RS) in the unlicensed band B2 based on a DRS (S170).

The UE 100 reports the measured RSRP/RSRQ to the E-UTRAN 30 (S180).

(3.3) Operation Definition Example

Next, a description is given of a definition example of how the UE 100 performs the above-described operation as defined in Technical Standard (TS) of 3GPP. Note that the following gives just a definition example, and a similar operation may be defined by a manner other than the definition example given below.

Figure 6:
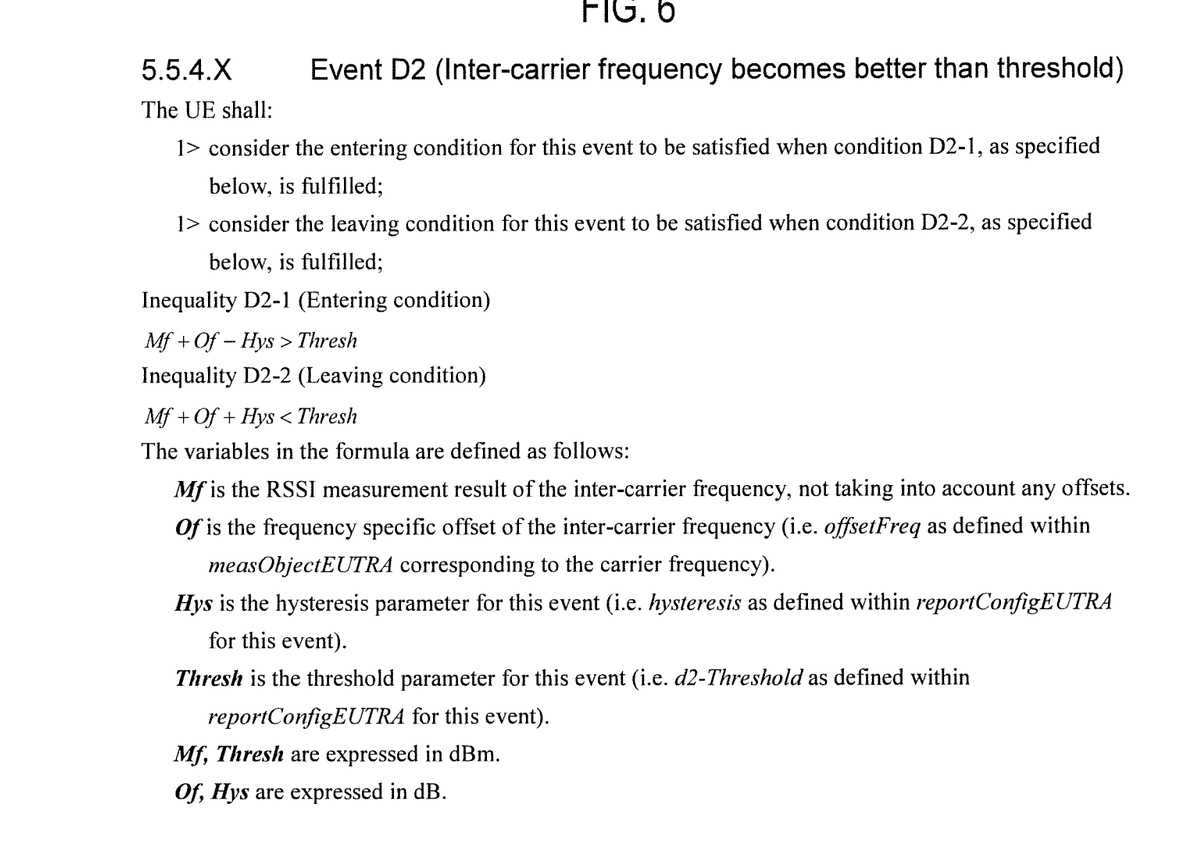
FIG. 6 is a diagram illustrating an example of an event (Clause 5.5.4.X) newly defined in Clause 5.5.4 of TS36.331.

FIG. 6 illustrates an example of an event (Clause 5.5.4.X) newly defined in Clause 5.5.4 of TS36.331. As shown in FIG. 6, this event (D2) defines an operation to be performed when a measurement result of RSSI in the frequency band of a measurement target different frequency carrier exceeds a predetermined threshold. The event is denoted as D2 for convenience, and may be named differently.

Specifically, D2-1 is defined as the entering condition. Further, D2-2 is defined as the leaving condition. In D2-1 and D2-2, the entering condition and the leaving condition are determined based on whether a value obtained from an RSSI measurement result (Mf), an offset (Of), and a hysteresis (Hys) exceeds a predetermined threshold (Thresh).

Figure 7:
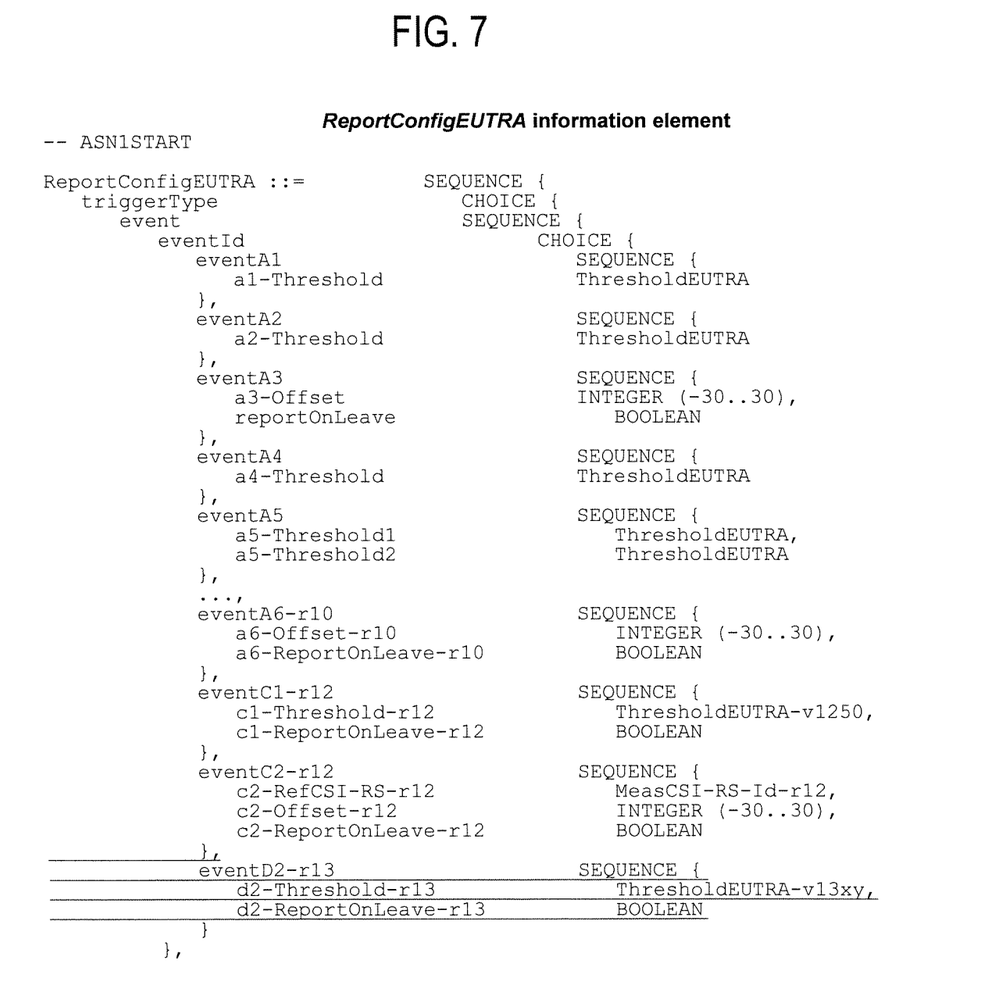
FIG. 7 is a diagram illustrating a definition example of a Report ConfigEUTRA defined in Clause 6.3.5 of TS36.331.
Figure 8:
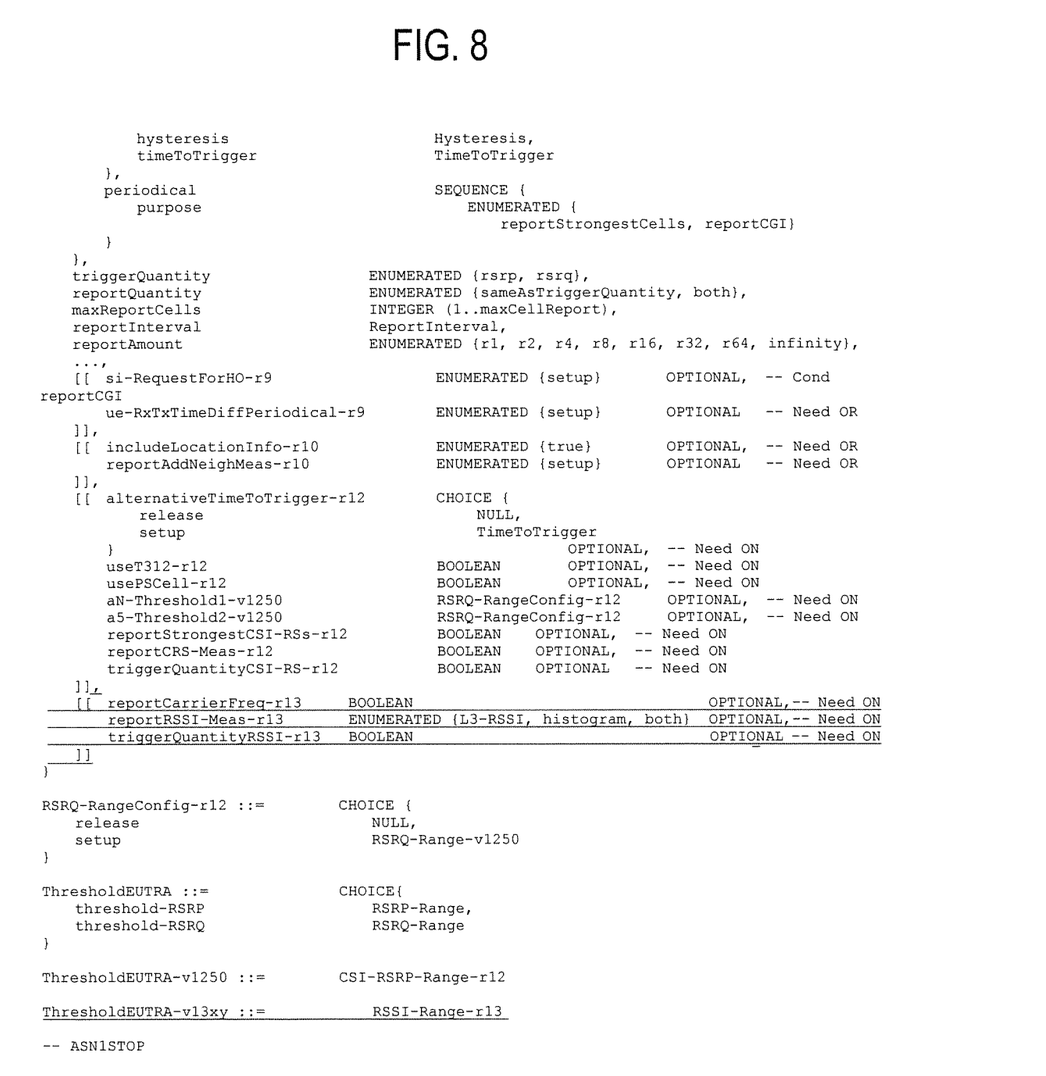
FIG. 8 is a diagram (part 2) illustrating the definition example of a Report ConfigEUTRA defined in Clause 6.3.5 of TS36.331.

FIGS. 7 and 8 illustrate a definition example of ReportConfigEUTRA defined in Clause 6.3.5 of TS36.331. Note that FIG. 8 is the continuation of what is shown in FIG. 7. The underlined part is a modification to the conventional definition.

As illustrated in FIGS. 7 and 8, a new event D2 is defined. Also, as new parameters, reportCarrierFreq-r13, reportRSSI-Meas-r13, and triggerQuantityRSSI-r13 are defined.

The parameter reportCarrierFreq-r13 indicates periodical RSSI measurements, and is used when the center frequency (carrierFreq) of the frequency band of a measurement target different frequency carrier belongs to the unlicensed band B2 and when measurement based on DRS (measDS-Config) is not set. Simply put, the UE 100 does not need to measure RSRP/RSRQ in this case.

The parameter reportRSSI-Meas-r13 specifies reporting of RSSI after Layer-3 filtering, a histogram of RSSI after Layer-3 filtering, or both of the RSSI and the histogram of RSSI after Layer-3 filtering.

The parameter triggerQuantityRSSI-r13 specifies the number of RSSI measurements to be reported.

ThresholdEUTRA-v13xy is also defined. ThresholdEUTRA-v13xy specifies the range of RSSI values.

(4) Advantageous Effects

The embodiment described above produces the following advantageous effects. When executing carrier aggregation by establishing the SCell 80 in the unlicensed band B2, the UE 100 repeatedly measures RSSI (received power) in the frequency band of the SCell 80. Then, when the RSSI measurement result exceeds a predetermined threshold, the UE 100 reports the measurement result to the E-UTRAN 30.

Thus, the UE 100 determines the timing to measure the RSSI and ensures reporting of the measured RSSI to the E-UTRAN 30. In other words, when the SCell 80 is established in the unlicensed band B2, the UE 100 can measure the RSSI of the unlicensed band B2 efficiently and report the measured RSSI to the E-UTRAN 30.

Further, since the RSSI of the unlicensed band B2 is thus reported to the E-UTRAN 30 efficiently, the E-UTRAN 30 (eNB 50) can promptly be aware of a change in reception quality in the frequency band of a measurement target carrier in the SCell 80 (a measurement target different frequency carrier), and efficiently add or delete the SCell 80 to or from the unlicensed band B2.

In the present embodiment, the UE 100 can report a RSSI measurement result, or specifically a histogram of RSSI, to the E-UTRAN 30 when the relative frequency in a given category in the histogram of RSSI exceeds a predetermined threshold.

Thus, the UE 100 can provide the E-UTRAN 30 with more reliable information about the reception state in the unlicensed band B2. This may allow efficient addition or deletion of the SCell 80 to or from the unlicensed band B2.

In the present embodiment, the UE 100 can report a histogram of RSSI to the E-UTRAN 30 based on a measurement result in the physical layer, the measurement result before Layer-3 filtering. Thus, the UE 100 can provide the E-UTRAN 30 with information indicating the actual reception state regarding the unlicensed band B2. This allows even more efficient addition or deletion of the SCell 80 to or from the unlicensed band B2.

In the present embodiment, the UE 100 can report, to the E-UTRAN 30, the average value of a RSSI measurement result after Layer-3 filtering. To the E-UTRAN 30, the UE 100 can also report, as the average value, the value in a category with the highest relative frequency in the histogram of RSSI. Thus, using a generated histogram of RSSI, the UE 100 can efficiently report an average value of RSSI to the E-UTRAN 30.

In the present embodiment, based on a report configuration (ReportConfig) acquired from the E-UTRAN 30, the UE 100 can report an RSSI histogram, an RSSI average value, or both the RSSI histogram and the RSSI average value to the E-UTRAN 30. Thus, the E-UTRAN 30 can easily acquire information on RSSI that the E-UTRAN 30 needs from the UE 100.

(5) Other Embodiments

Although the present invention has been described above using the embodiment, it is obvious to those skilled in the art that the present invention is not limited to what is described above and can be variously modified and changed.

For example, in the above embodiment, the UE 100 determines to report an RSSI measurement result to the E-UTRAN 30 when the RSSI measurement result exceeds a predetermined threshold. The UE 100 may report an RSSI histogram or an RSSI average value to the E-UTRAN 30 when, as the RSSI measurement result, a relative frequency in a given category in the RSSI histogram, not the simple average of a plurality of measurements, exceeds a predetermined threshold.

Further, although an RSSI report configuration is specified using ReportConfigEUTRA in the above embodiment, the RSSI report configuration does not necessarily have to be used, and a different information element may be used to instruct an RSSI report configuration from the UE 100.

Although the above-described embodiment takes LTE as an example, LTE includes LTE-Advanced, and the present invention is not limited to LTE.

The block diagram used in the above description of the embodiment is a functional block diagram. These functional blocks (constituents) are implemented by any hardware and/or software combination. Further, there is no limitation on the means of implementing the functional blocks. Specifically, each functional block may be implemented by a single apparatus integrated physically and/or logically, or may be implemented by a plurality of apparatuses which are separated physically and/or logically and connected to each other directly and/or indirectly (e.g., by wired connection and/or wireless connection).

Figure 9:
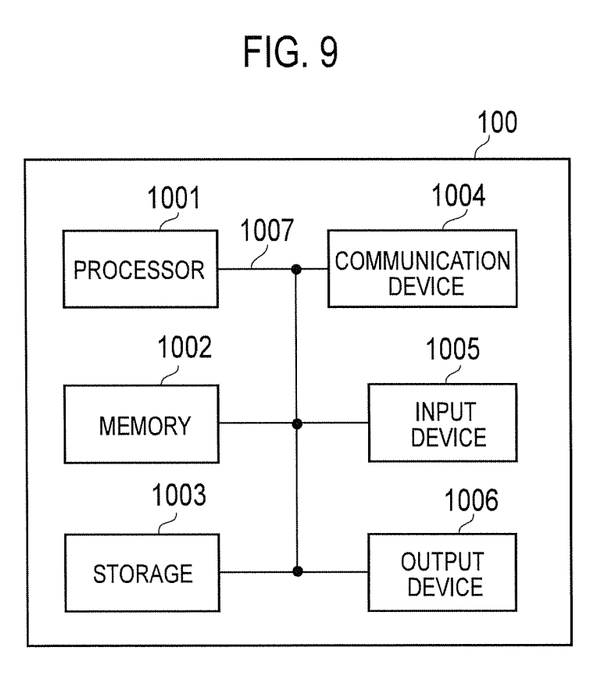
FIG. 9 is a diagram illustrating an example of the hardware configuration of the UE 100.

Further, the UE 100 described above may function as a computer that performs processing in accordance with the wireless communication method of the present invention. FIG. 9 is a diagram illustrating an example of the hardware configuration of the UE 100. As illustrated in FIG. 9, the UE 100 may be configured as a computer device including a processor 1001, a memory 1002, a storage 1003, a communication device 1004, an input device 1005, an output device 1006, a bus 1007, and the like.

The processor 1001 controls the entire computer by, for example, running an operating system. The processor 1001 may be formed by a central processing unit (CPU) including an interface with a peripheral, a control device, a computation device, a register, and the like.

The memory 1002 is a computer-readable recording medium, and may be formed by at least one of, for example, a ROM (Read Only Memory), an EPROM (Erasable Programmable ROM), an EEPROM (Electrically Erasable Programmable ROM), a RAM (Random Access Memory), and the like. The memory 1002 may be called a register, a cache, a main memory (a main storage device), or the like. The memory 1002 can store programs (program code), software modules, and the like with which the method according to the above-described embodiment is executable.

The storage 1003 is a computer-readable recording medium, and may be formed by at least one of, for example, an optical disk such as a CD-ROM (Compact Disc ROM), a hard disk drive, a flexible disk, a magneto optical disk (e.g., a compact disk, a digital versatile disk, or a Blu-ray (registered trademark) disk), a smart card, a flash memory (e.g., a card, stick, or key drive), a Floppy (registered trademark) disk, a magnetic strip, and the like. The storage 1003 may be called an auxiliary storage device. The above-described storage media may be, for example, a database, a server, or other appropriate media including the memory 1002 and/or the storage 1003.

The communication device 1004 is hardware (a transmitter/receiver device) that implements inter-computer communication via a wired network and/or a wireless network, and is also referred to as, for example, a network device, a network controller, a network card, a communication module, or the like.

The input device 1005 is an input device (such as, for example, a keyboard, a mouse, a microphone, a switch, a button, or a sensor) that receives inputs from outside. The output device 1006 is an output device (such as, for example, a display, a loudspeaker, or an LED lamp) that makes an output to outside. Note that the input device 1005 and the output device 1006 may have an integral configuration together (e.g., a touch panel).

These devices such as the processor 1001 and the memory 1002 may be connected to one another via the bus 1007 for information communications. The bus 1007 may be formed by a single bus or a plurality of different buses to connect the devices.

Notification of information is not limited to the method described in the above embodiment, and may be carried out with a different method. For example, notification of information may be performed by physical-layer signaling (e.g., DCI (Downlink Control Information) or UCI (Uplink Control Information), an upper-layer signaling (e.g., RRC signaling, MAC (Medium Access Control) signaling, broadcast information (MIB (Master Information Block) or SIB (System Information Block)), other signals, or a combination of the above. RRC signaling may also be called an RRC message, and may be, for example, an RRC Connection Setup message, an RRC Connection Reconfiguration message, or the like.

Further, inputted or outputted information may be stored in a specific location (e.g., memory), or managed in a management table. Inputted or outputted information may overwrite, update, or add to exiting information. Outputted information may be deleted. Inputted information may be transmitted to another device.

The steps in the sequence, the flowchart, and the like described in the above embodiment may be changed in order as long as the change does not cause contradiction.

The terms described in this Description and terms necessary for the understanding thereof may be interchanged with terms that have the same or similar meanings. For example, a channel and/or a symbol may be a signal. Further, a signal may be a message. In addition, the terms "system" and "network" may be interchangeably used.

Furthermore, the above-described parameters may be represented with absolute values, absolute values from pre-determined values, or corresponding but different information. For example, an instruction concerning radio resources may be given by an index.

The eNB 50 (base station) can accommodate one or more (three for example) cells (also called sectors). When a base station accommodates a plurality of cells, the entire coverage area of the base station may be divided into smaller areas for each of which a communication service can be provided by a base station sub-system (e.g., an indoor small base station RRH: Remote Radio Head).

The terms "cell" and "sector" indicate part or all of the coverage area of abase station and/or a base station sub-system providing a communication service in this coverage. Further, the terms "base station" and "eNB" aswell as "cell" and "sector" may be interchangeably used herein. A base station may also be called a fixed station, a NodeB, an eNodeB (eNB), an access point, a femtocell, a small cell, or by other terms.

The UE 100 may also be called a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or by some other suitable terms.

The phrase "based on" used herein does not mean "based solely on" unless otherwise specified. In other words, the phrase "based on" includes both meanings of "based solely on" and "based at least on".

Further, the terms "including", "comprising", and their conjugational forms are intended to be comprehensive. Further, the term "or" used in this Description and CLAIMS is not intended to be an exclusive-or.

The present invention can be expressed as follows. A mobile station (UE100) according to an aspect of the present invention performs carrier aggregation by establishing a secondary cell (SCell 80) in a specific frequency band (unlicensed band B2) requiring no license, the mobile station. The mobile station includes a received power measurement unit (RSSI measurement unit 133) that repeatedly measures received power (RSSI) in the frequency band of the secondary cell; a report determination unit (report determination unit 140) that determines, based on a measurement result of the received power measured by the received power measurement unit, whether the measurement result is to be reported to a radio access network (E-UTRAN 30); and a measurement report unit (measurement report unit 150) that reports the measurement result to the radio access network. The report determination unit determines that the measurement result is to be reported to the radio access network when the measurement result exceeds a predetermined threshold.

Preferably, in the aspect of the present invention, the report determination unit determines that the measurement result of the received power is to be reported to the radio access network if a probability in a predetermined category in a frequency distribution (histogram) of the measurement result exceeds a predetermined threshold.

Preferably, in the aspect of the present invention, the measurement report unit reports a frequency distribution of the measurement result of the received power to the radio access network.

Preferably, in the aspect of the present invention, the measurement report unit reports the frequency distribution based on the measurement result in a physical layer before filtering based on a predetermined report condition (Layer-3 filtering), to the radio access network.

Preferably, in the aspect of the present invention, the measurement report unit reports an average value of the measurement result after filtering based on a predetermined report condition, to the radio access network.

Preferably, in the aspect of the present invention, the measurement report unit reports, as the average value, a value in a category with the highest relative frequency in a frequency distribution of the measurement result of the received power, to the radio access network.

Preferably, in the aspect of the present invention, the mobile station includes a report configuration acquisition unit (report configuration acquisition unit 120) that acquires a report configuration from the radio access network, the report configuration specifying a format for reporting the measurement result, in which the report configuration specifies whether to report a frequency distribution of the measurement result, an average value of the measurement result, or both of the frequency distribution and the average value, and based on the report configuration acquired by the report configuration acquisition unit, the measurement report unit reports the frequency distribution, the average value, or both of the frequency distribution and the average value to the radio access network.

A mobile communication method according to another aspect of the present invention relates to a mobile communication method for performing carrier aggregation by establishing a secondary cell in a specific frequency band requiring no license. The mobile communication method includes repeatedly measuring received power in the frequency band of the secondary cell; determining, based on a measurement result of the received power measured, whether the measurement result is to be reported to a radio access network; and reporting the measurement result to the radio access network. The determining involves reporting the measurement result to the radio access network when the measurement result exceeds a predetermined threshold.

Although the embodiments of the present invention have been described above, it should not be understood that the description and drawings which constitute part of this disclosure limit the present invention. From this disclosure, various alternative embodiments, examples, and operation techniques will be easily found by those skilled in the art.

Note that the entire content of Japanese Patent Application No. 2015-128712 (filed on Jun. 26, 2015) is incorporated herein by reference in the present specification.

INDUSTRIAL APPLICABILITY

According to the above-described mobile station and mobile communication method, it is possible to measure received power of an unlicensed band efficiently and report the measured received power to a radio access network, when a secondary cell (SCell) is established in the unlicensed band.

EXPLANATION OF THE REFERENCE NUMERALS 10 mobile communication system
20 IP network
30 E-UTRAN
40 wireless LAN
50 eNB
60 access point
70 PCell
80 SCell
100 UE
111 PCell communication unit
113 SCell communication unit
120 report configuration acquisition unit
131 RSRP/RSRQ measurement unit
133 RSSI measurement unit
140 report determination unit
150 measurement report unit
B1 licensed band
B2 unlicensed band

The invention claimed is:

1. A mobile station comprising:
a processor that performs carrier aggregation by establishing a secondary cell in a specific frequency band requiring no license;
a received power measurement unit that repeatedly measures received power in the frequency band of the secondary cell;
a report determination unit that determines, based on a measurement result of the received power measured by the received power measurement unit, whether the measurement result is to be reported to a radio access network; and
a measurement report unit that reports the measurement result to the radio access network based on the determination of the report determination unit,
wherein the report determination unit determines that the measurement result of the received power is to be reported to the radio access network if an occupancy of the repeated measurements in a predetermined category in a frequency distribution of the measurement result exceeds a predetermined occupancy threshold,
wherein the received power measurement unit applies Layer-3 filtering to the repeated measurements of the received power in the frequency band of the secondary cell, and
wherein the report determination unit determines the occupancy from the Layer-3 filtered repeated measurements.

2. The mobile station according to claim 1, wherein the measurement report unit reports a frequency distribution of the measurement result of the received power to the radio access network.

3. The mobile station according to claim 2, wherein to the radio access network, the measurement report unit reports the frequency distribution based on the measurement result in a physical layer before filtering based on a predetermined report condition.

4. The mobile station according to claim 1, wherein to the radio access network, the measurement report unit reports the average value of the measurement result after filtering based on a predetermined report condition.

5. The mobile station according to claim 4, wherein to the radio access network, the measurement report unit reports, as the average value, a value in a category with the highest relative frequency in a frequency distribution of the measurement result of the received power.

6. A mobile communication method comprising:
performing carrier aggregation by establishing a secondary cell in a specific frequency band requiring no license;
repeatedly measuring received power in the frequency band of the secondary cell;
acquiring a report configuration from the radio access network, the report configuration specifying a format for reporting the measurement result;
determining, based on a measurement result of the received power measured, whether the measurement result is to be reported to a radio access network; and
reporting the measurement result to the radio access network based on the determination,
applying Layer-3 filtering to the repeatedly measured received power in the frequency band of the secondary cell, wherein
the determining involves reporting the measurement result to the radio access network if an occupancy of the repeated measurements in a predetermined category in a frequency distribution of the measurement result exceeds a predetermined occupancy threshold and
in determining whether the measurement result is to be reported to a radio access network, the occupancy is based on the Layer-3 filtered repeated measurements.

* * * * *